United States Patent [19]

Rabii et al.

[11] Patent Number: 4,663,668
[45] Date of Patent: May 5, 1987

[54] BRIGHTNESS CLAMPING APPARATUS FOR TV RECEIVER WITH MULTIPLE INPUTS

[75] Inventors: Khosro M. Rabii, Indianapolis; Russell T. Fling, Noblesville, both of Ind.

[73] Assignee: RCA Corporation, Princeton, N.J.

[21] Appl. No.: 873,658

[22] Filed: Jun. 12, 1986

[51] Int. Cl.⁴ .................................... H04N 5/262
[52] U.S. Cl. ........................... 358/171; 358/168; 358/181
[58] Field of Search ............... 358/168, 171, 172, 166, 358/181, 183, 22

[56] References Cited

U.S. PATENT DOCUMENTS 3,526,710  9/1970  Martin ........................... 358/172
4,562,475 12/1985  Levine ........................... 358/171

OTHER PUBLICATIONS

U.S. patent application, Ser. No. 780,014, filed 9/25/85, Filliman et al.

*Primary Examiner*—Tommy P. Chin
*Attorney, Agent, or Firm*—Paul J. Rasmussen; Eric P. Herrmann; Dilip A. Kulkarni

[57] ABSTRACT

A television receiver is arranged to selectively display images from several input signal sources—such as pix-in-pix, teletext, computer graphics, besides displaying pictures from the normal off-the-air television signal. In accordance with this invention, clamping circuits are provided for establishing a constant black image reference level for all the input signals.

18 Claims, 5 Drawing Figures

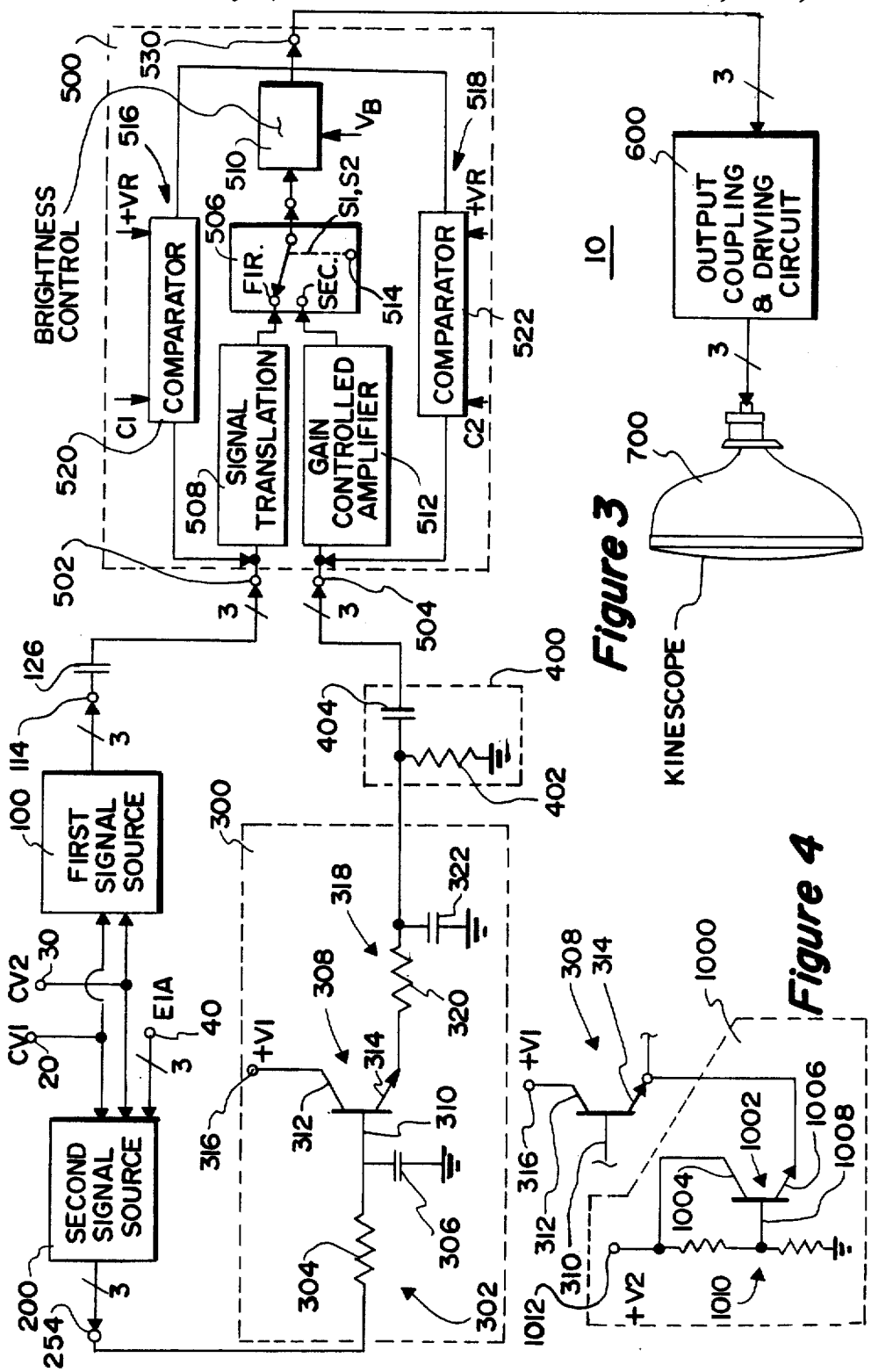

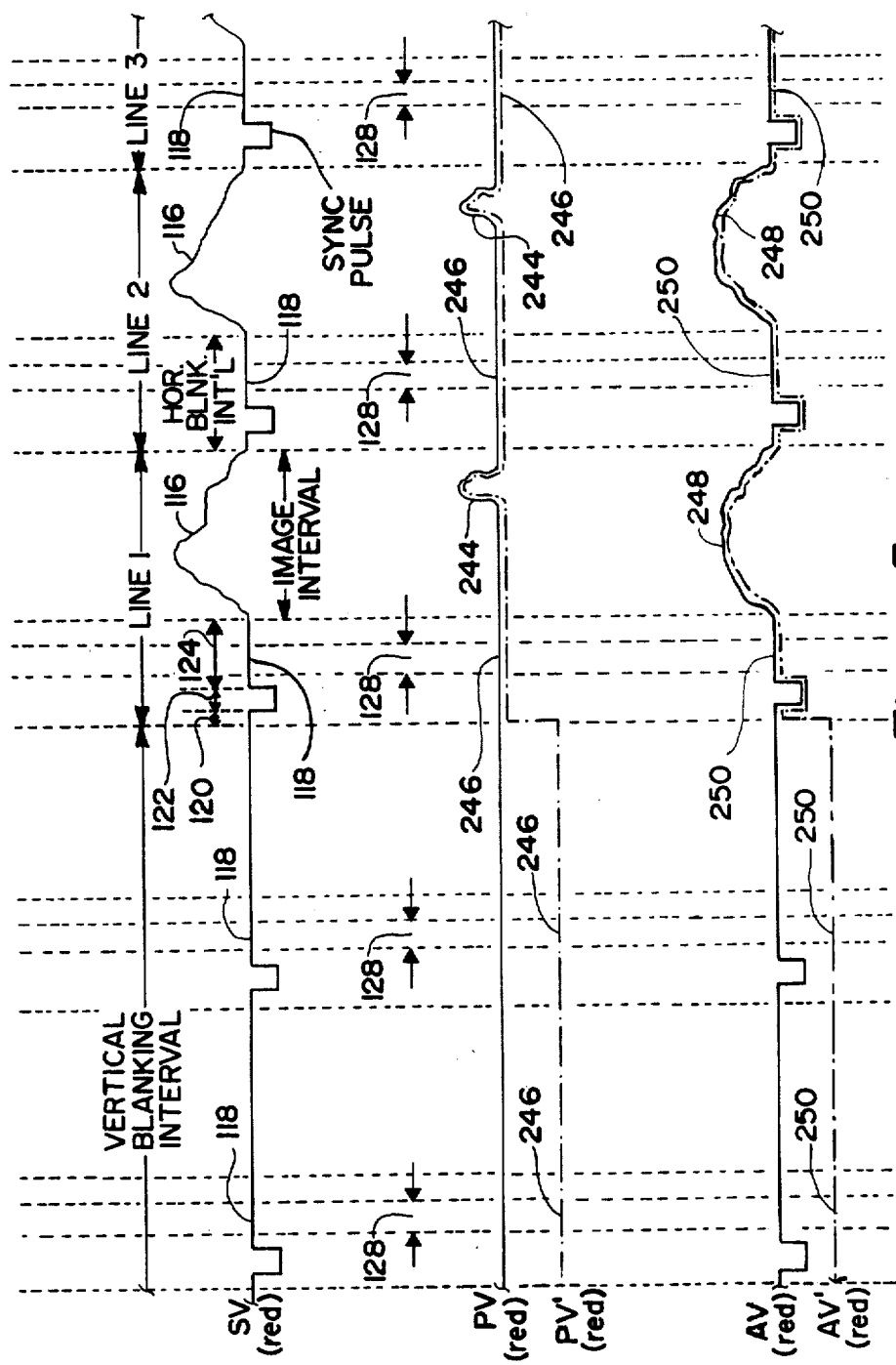

BRIGHTNESS CLAMPING APPARATUS FOR TV RECEIVER WITH MULTIPLE INPUTS

This invention relates to an apparatus for establishing a substantially constant brightness level in a television (TV) receiver capable of selectively displaying video information from multiple input sources.

BACKGROUND

One type of TV receiver is equipped with an auxiliary or EIA input connector for receiving an auxiliary video signal (for example, computer graphics signal, teletext signal, etc.) in addition to receiving off-the-air broadcast TV signal applied to its antenna terminals. Both off-the-air and auxiliary video signals are capacitively coupled to a signal selection network, which applies one of the two input signals to an image display device or a kinescope in response to a control signal.

The signal selection network includes output clamping circuits, responsive to a preset reference potential and coupled to the respective signal paths, for automatically establishing a common black image or brightness level for the video signals applied to the kinescope. The clamping circuits work well as long as the black image component reference levels of the incoming video signals applied to the signal selection network are held substantially constant. Any fluctuations in the black image reference levels of the incoming signals may cause corresponding variations in the brightness levels of the pictures displayed on the TV screen.

SUMMARY OF INVENTION

In accordance with the present invention there is disclosed herein an apparatus in a video signal processing and display system, such as a TV receiver, for providing displayed images with a substantially constant black reference level. The disclosed apparatus includes an input signal clamping circuit interposed between a video signal source and an associated capacitor coupling the input video signal to the selection network for automatically controlling the black image reference level of the input video signal, whereby undesirable variations in the brightness level of the displayed images are reduced.

IN THE DRAWINGS

FIG. 3 shows the details of a signal selection network including respective output clamping circuits for use in the TV receiver of FIG. 1;

FIG. 4 depicts an input signal clamping circuit suita for use with the FIG. 3 signal selection network in accordance with the present invention; and FIG. 5 depicts waveforms helpful in understanding the operation of the subject input clamping circuit.

DETAILED DESCRIPTION

Figure 1:
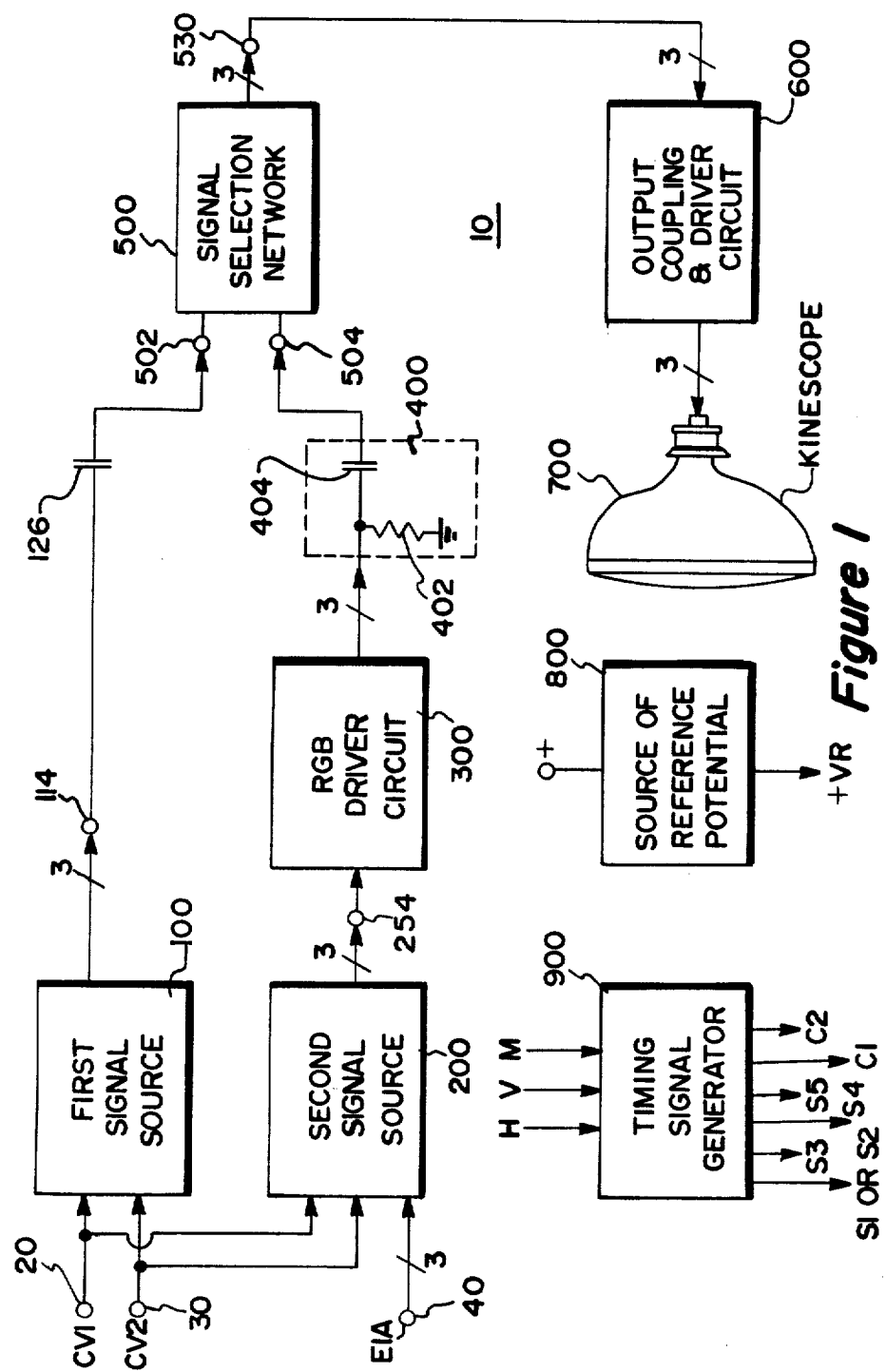
FIG. 1 is a block diagram representation of a TV receiver capable of selectively displaying image information from one of several video signal sources.

In the drawings, the single lines connecting the various blocks represent conductors carrying analog signals and the double lines connecting the respective blocks represent buses carrying multibit digital signals. A number next to a slash mark (/) intercepting the interconnecting single and double lines indicates the number of parallel conductors carrying the respective signals.

In FIG. 1, a numeral 10 denotes a TV receiver having first and second video signal sources 100 and 200. The red, green and hlue components of the first video signal are applied via a first input coupling capacitor 126 to a first input terminal 502 of a signal selection network 500. The red, green and blue components of the second video signal are, on the other hand, applied to a second input terminal 504 of the signal selection network 500 via an RGB driver circuit 300 and a capacitive coupling network 400.

The signal selection network 500 selectively couples one of the two input terminals 502 and 504 to its output terminal 530 in response to a switching control signal in the manner described later. The output signal from the signal selection network 500 is coupled to an output coupling and driver circuit 600, which provides amplified red, green and blue signals to the respective intensity control electrodes of an image display device or a kinescope 700.

It will be noted that three separate signal components—red, green and blue—of the analog color video signal are conveyed by the respective conductors (indicated by the single lines with a numeral 3 next to the slash mark), and are processed by separate processing circuits, where appropriate. For example, 3 RGB driver circuits 300, 3 capacitive coupling networks 400 and 3 signal selection networks 500 are provided—one for each color component. Since the structure and operation of these separate circuits for processing the respective red, green and blue signals are identical, only one circuit is shown and described in detail.

The TV receiver 10 is oapable of generating a small picture inside a large main picture displayed on the full screen. To this end, a pair of composite color video signals CV1 and CV2 (e.g., in the NTSC format) are applied to the respective input terminals 20 and 30 of the TV receiver 10. The two composite video signals CV1 and CV2 may be from a tuner in the TV receiver 10 and a tuner in the video cassette recorder (VCR) attached to the TV receiver, respectively. One of the two composite video signals CV1 and CV2 is used to produce a full picture and the other video signal is used to produce a small inset picture.

In addition to having a pix-in-pix feature (i.e., a small picture inside a large picture), the TV receiver 10 is also capable of displaying an auxiliary video signal coupled to an EIA connector 40. Illustratively, the auxiliary video signal may be a teletext signal or a computer graphics signal.

Figure 2:
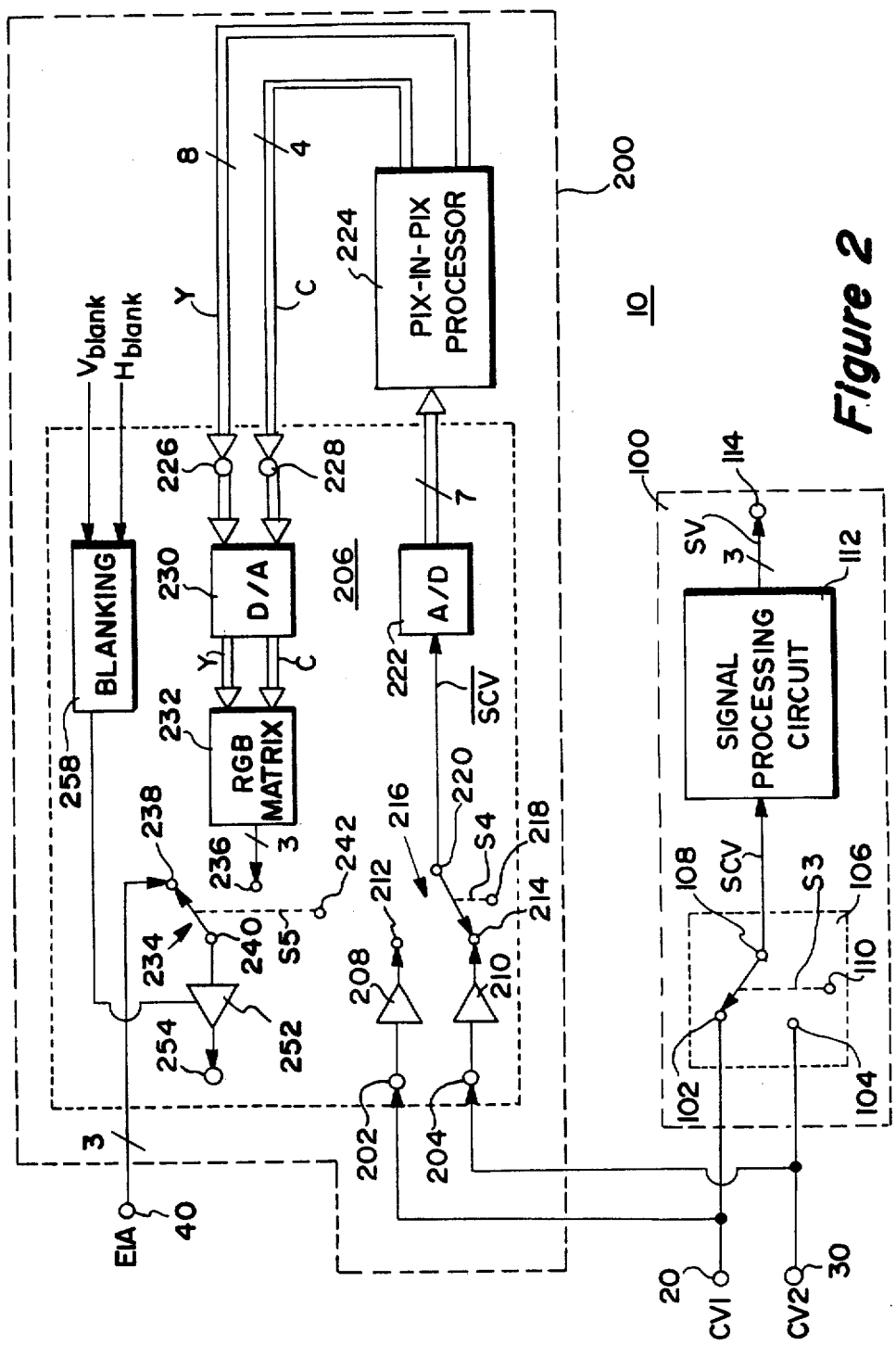
FIG. 2 illustrates the details of the FIG. 1 video signal sources.

FIG. 2 illustrates the circuitry for generating the RGB components of the various input signals for application to the kinescope 700. The two off-the-air, composite color video signals CV1 and CV2 are respectively coupled to first and second input terminals 102 and 104 of a composite video signal switch 106. The composite video signal switch 106 selectively applies one of the two input signals CV1 and CV2 to its output terminal 108 in response to a switching control signal S3 applied to its control signal input terminal 110. The selected composite video signal SCV is fed to the signal processing circuits 112, which may be conventional video signal processing circuits, of the TV receiver 10. The signal processing circuits 112 process the selected video signal SCV to derive the red, green and blue or RGB signals for application to a first input terminal 502 of the signal selection network 500.

Illustratively, the waveform of the red component of the processed video signal SV from the signal processing circuit 112 is depicted in FIG. 5. The red signal SV (red) consists of an image information component 116 occurring during periodic image intervals and a black image reference component 118 occurring during the periodic horizontal and vertical blanking intervals. The horizontal blanking interval comprises a front porch interval 120, a horizontal synchronizing pulse interval 122 and a back porch interval 124. The back porch interval 124, in turn, includes a black image reference component interval 128. The black image reference component intervals 128 coincides with the respective burst gate intervals used for keying the color burst signal incorporated in the composite video signal SCV. The values of the video signal occurring during the black image reference component intervals 128 are used for setting the brightness levels of the displayed images on the kinescope 700.

As previously stated, one of the two composite video signals CV1 and CV2 is used to generate a full picture on the kinescope screen. The other composite video signal is used to generate a pix-in-pix or PIP signal. To this end, the two composite video signals CV1 and CV2 are applied to the respective input terminals 202 and 204 of a video coding/decoding integrated circuit or a video codec unit 206 the incoming composite video signals CV1 and CV2 are amplified by respective input amplifiers 208 and 210. The amplified composite video signals CV1 and CV2 are applied to the respective input terminals 212 and 214 of a second composite video signal switch 216 embodied in the video codec unit or VCU 206. In response to a control signal S4 applied to its control input terminal 218, the composite video signal switch 216 couples the other of the composite video signals CV1 and CV2, designated herein as $\overline{SCV}$, to an output terminal 220. The control signals S3 and S4 respectively applied to the switches 106 and 216 for selecting the source of video signals to be displayed as main picture and inset picture are generated under user control.

The composite video signal e,ovs/SCV/ from the switch 216 is applied to an analog-to-digital (A/D) converter 222, where it is transformed into a 7-bit digital signal, for example, for application to a digital PIP processor 224. The PIP processor 224 generates luminance and chrominance signals, which are synchronized with the signals provided by the signal processing circuits 112 and are respectively coupled to a second set of input terminals 226 and 228 of the VCU 206.

A digital-to-analog (D/A) converter 230 reconverts the digital luminance and chrominance signals into respective analog signals. In an RGB matrix 232, the analog luminance and chrominance signals are dematrixed to generate the RGB components of the PIP signal for application to an input terminal 236 of an RGB switch 234.

The red component of the processed PIP signal is indicated as PV (red) in FIG. 5. It includes an image information component 244 occurring during periodic image intervals and a black image reference component 246 occurring during periodic horizontal and vertical blanking intervals.

The RGB components of an auxiliary video signal (e.g., teletext or computer graphics signal) are coupled to an EIA connector 40. The red component of the auxiliary video signal is indicated as AV (red) in FIG. 5. It consists of an image information component 248 occurring during periodic image intervals and a black image reference component 250 occurring during the periodic horizontal and vertical blanking intervals.

The RGB switch 234 incorporated in the VCU 206 couples either the RGB components of the processed PIP signal applied to the input terminal 236 or the RGB components of the auxiliary video signal coupled to a second input terminal 238 to its output terminal 240 in response to a switching control input signal S5 applied to its control input terminal 242. The selected RGB signals are amplified by an output amplifier 252 and coupled to an output terminal 254 of the VCU 206.

For further details of the VCU 70, refer to an ITT publication "DIGIT 2000 VLSI DIGITAL TV SYSTEM", available from the ITT Intermetall Semiconductors Division. The DIGIT 2000 system comprises a series of VLSI circuits, including the VCU 206, for digital signal processing of the TV signals.

During vertical blanking intervals, the VCU output amplifier 252 is conditioned by a blanking circuit 258 to provide an ultrablack output potential to permit, among other things, automatic set-up of the kinescope beam current. The blanking circuit 258 develops the signal to control the output amplifier 252 from the horizontal and vertical blanking signals H and V derived, in turn, from the composite video signals by conventional techniques.

The resulting auxiliary and PIP signals at the output of the amplifier 252 are the same as the signals at the input thereof, except that the output signals are switched to ultrablack during the vertical blanking intervals. The auxiliary and PIP signals at the output terminal 254 of the VCU 206 are shown by the dash-dot lines in FIG. 5, and identified as AV' and PV', respectively.

FIG. 3 depicts the signal selection network 500 including the respective output clamping circuits 516 and 518. The signal selection network 500 selectively applies one of the two input video signals to the kinescope 700, and tries to maintain the same brightness level regardless of the source of the displayed information in the manner described below.

As stated previously, the first video signal SV is applied to the first input terminal 502 of the signal selection network 500 via the coupling capacitor 126. The second video signal, either AV' or PV', from the VCU 206 is applied to the second input terminal 504 via the RGB driver circuit 300 and the capacitive coupling network 400.

The RGB driver 300 includes an NPN transistor 308, connected as an emitter follower, having its base electrode 310 coupled to the output terminal 254 of the VCU 206 via a low pass filter 302, comprising a series resistor 304 and a shunt capacitor 306. The collector electrode 312 of the transistor 308 is coupled to a source 316 of supply potential +V. The emitter electrode 314 of the transistor 308 is to the capacitive coupling network 400 via another low pass filter circuit 318, comprising a series resistor 320 and a shunt capacitor 322.

The capacitive coupling network 400 comprises a terminating resistor 402 and a coupling capacitor 404. The respective coupling capacitors 126 and 404 eliminate the effects of cumulative DC errors from preceding OC coupled circuits, and also eliminate problems of incompatibility between the DC output levels of the video signal sources 100 and 200 and the DC input requirements of the signal selection network 500. Moreover, the coupling capacitors 126 and 404 act as clamping capacitors in conjunction with the respective output clamping circuits 516 and 518 incorporated in the signal selection network 500, whereby additional clamping capacitors are not needed.

The signal selection network 500 includes an electronic switch 506 with first and second positions. When the electronic switch 506 is in the first position the signals from the first source 100 are coupled to the kinescope 700 via a first signal path comprising the coupling capacitor 126, a signal translation circuit 508, the switch 506, a brightness control circuit 510 and the output coupling and driving circuit 600. When the electronic switch 506 is in the second position, the signals from the second source 200 are coupled to the kinescope 700 via a second signal path including the coupling capacitor 404, a gain controlled amplifier 512, the switch 506, the brightness control circuit 510 and the output coupling and driving circuit 600.

The position of the electronic switch 506 is controlled by a pair of control signals S1 and S2 applied to a control input terminal 514. When the control signal S1 is applied to the switch 506, it occupies the first position—except during the black image reference intervals 128 of the even numbered horizontal lines (e.g., lines 2, 4, 6, etc.). On the other hand, when the control signal S2 is applied to the switch 506, it occupies the second position—except during the black image reference intervals 128 of the odd numbered horizontal lines (i.e., lines 1, 3, 5, etc.). For further details, see below mentioned Filliman et al. U.S. patent application (Ser. No. 780,014).

As previously indicated, it is desirable to maintain substantially the same black image reference level for all the input signal sources (e.g., composite video signals, teletext signal, computer graphics signal, etc.), so that disturbing changes in the image brightness or color temperature are held to a minimum. To this end, the output clamping circuits 516 and 518 are incorporated in the signal selection network 500.

The first clamping circuit 516 includes a first keyed differential comparator 520. Responsive to a keying signal C1, the comparator 520 operates during the black image reference jintervals 128 of the odd numbered horizontal lines. It compares the black image reference voltage at the output of the brightness control circuit 510 with a preset reference voltage VR provided by a reference potential source 800, indicated in FIG. 1. As a result of the comparison, a control current representative of the difference in the respective input voltages is produced at the output of the comparator 520. The control current is applied to the first input coupling capacitor 126 to modify the charge thereon, and thereby the DC condition of the first signal path. This assures a substantially constant black image reference voltage for the first signal path of the signal selection network 500, the value of which is dictated by the preset reference voltage VR.

The second clamping circuit 518 includes a second keyed differential compapator 522. It operates during the black image reference intervals 128 of the even numbered horizontal lines in response to a keying signal C2. The comparator 522 compares the black image reference voltage at the output of the brightness control circuit 510 with the preset reference voltage VR. A control current, indicative of the difference in the comparator input voltages, is applied to the second input coupling capacitor 404 to alter the DC bias of the second signal path in a like manner.

It should be noted that in the first and second clamping circuits 516 and 518 are alternately operational during the black image reference intervals 128 of the odd and even numbered horizontal lines respectively, regardless of which of the two control signals S1 and S2 are applied to the electronic switch 506.

The keying and control signals are generated by a timing signal generator 900, indicated in FIG. 1. The timing signal generated 900 responds to horizontal and vertical image synchronizing signals H and V developed by conventional deflection synchronizating circuits of the TV receiver 10. The timing signal generator 900 also responds to a mode control signal M, which determines which one of the signals S1 and S2 is provided to the control input terminal 514 of the signal selection network 500. The mode control signal M may be developed either automatically by circuits within the TV receiver 10, or manually by a viewer when switching between a first image display mode and a second image display mode. For example, the display of a small picture on the kinescope screen may proceed automatically by causing the electronic switch 506 to switch between the first and second image display modes as required to display the small picture on a portion of the screen, which otherwise would have displayed the signals from the first source 100. Alternately, the auxilliary signals coupled to the EIA connector 40 may be continuously displayed on the whole screen by manually setting a viewer controlled switch (not shown.)

The details of the signal selection network 500 including the output clamping comparators 520 and 522 are the timing signal generator 900 are given in a commonly-assigned U.S. patent application Ser. No. 780,014, filed for Filliman et al. and entitled "TELEVISION RECEIVER WITH SELECTABLE VIDEO INPUT SIGNALS".

A problem with clamping the DC condition of the second signal path using aforesaid Filliman et al. approach is that the voltage at theoutput terminal 254 of the VCU 206 during the black image reference intervals 128 fluctuates between the ultrablack level and the black level. As previously stated, the VCU 206 outputs the ultrablack voltage (e.g., about 1.6 volts) during the vertical blanking intervals, instead of the normal black voltage (e.g., approximately 3.2 volts), in the manner indicated by the auxiliary and PIP video signals —AV' and PV', respectively, in FIG. 5.

When the voltage on the upstream or input side of the second input coupling capacitor 404 drops to the ultrablack level (during the vertical blanking intervals while the VCU 206 is being programmed), the second comparator 522 tries to maintain the DC condition of the second signal path of the signal selection network 500 at a level dictated by the preset reference voltage VR by pumping extra charge into the second input coupling capacitor 404. This, in turn, artificially boosts the DC bias condition of the second signal path, whereby the brightnerss level of the signals derived from the VCU 206 is increased when the scanning resumes.

Upon termination of the vertical blanking interval, the voltage on the upstream side of the second input coupling capacitor 404 during the black image reference intervals 128 returns to the black level. As this happens, the charge on the second input coupling capacitor 404 is gradually discharged to the desired level. As the capacitor 404 discharges, the brightness of the pictures produced on the kinescope screen by the signals derived from the VCU 206 fades until it is the 0 same as that of the pictures derived from the first signal source 100.

Thus, when the signals from the VCU 206 are displayed on the whole screen (e.g., computer graphics information), the brightness of the picture is highest near the top edge of the kinescope screen and the brightness gradually fades toward the bottom edge of the screen. This problem also occurs when a small inset picture is displayed near the top edge of the kinescope screen.

In accordance with this invention, an input signal clamping circuit 1000, shown in FIG. 4, is provided to introduce an artificial bias level for the second signal path in the presence of an ultrablack signal at the output of the VCU 206 during the vertical blanking interval. This prevents the second input coupling capacitor 404 from charging when the VCU output signal is switched to ultrablack, and thereby producing an ultrabright picture near the top edge of the kinescope screen that fades toward the bottom edge of the screen.

The input clamping circuit 1000 comprises an NPN transislor 1002 having its collector 1004 coupled to a source 1012 of reference potential (e.g., +5 volts), an emitter 1006 coupled to the emitter 314 of the RGB driver transistor 308 and a base 1008 coupled to an appropriate point on the voltage divider 1010. The point on the voltage divider 1010 is chosen substantially equal to the black level output voltage (e.g., about 3.2 volts) of the VCU 206.

When the output potential of the VCU 206 goes below the black level voltage during the vertical blanking intervals, (1) the RGB driver transistor 308 is reverse biased to decouple the VCU from the second input coupling capacitor 404, and (2) the auxiliary bias transistor 1002 is forward biased to clamp the emitter 314 of the RGB driver transistor, and thus the input side of the capacitor 404, to a pre-determined voltage level. The pre-determined voltage level (e.g., 2.5 volts) at the emitter 314 of the RGB driver transisror 308 is, in turn, established by the voltage at the hase 1008 of the auxiliary bias transistor. 1002 (e.g., 3.2 volts—as determined by the voltage divider 1010) minus its base-to-emitter voltage drop (e.g., 0.7 volts). Thus, the upstream side of the second input coupling capacitor 404 is clamped during the entire vertical blanking interval while the VCU output remains at the ultrablack level.

When the normal scanning resumes, the VCU output voltage rises above the preset voltage level (e.g., about 3.2 volts), and the RGB driver transistor 308 is conditioned to again couple the VCU output signal to the signal selection network 500 via the coupling capacitor 404. As the potential on the emitter 314 of the RGB driver transistor 308 rises above 2.5 volts, the base/emitter junction of the auxi ary bias transistor 1002 is reverse biased, effectively decoupling the input clamping circuit 1000 from the RGB driver circuit 300.

From the foregoing, it will be seen that the input clamping circuit 1000, in accordance with the subject invention, prevents the pictures produced on the kinescope screen from becoming ultrabright near the top edge of the screen and then fading toward its bottom edge.

What is claimed is:

1. A video signal processing system including an image display device, comprising:
    a first signal source for providing a first video signal having an image information component occurring during periodic image intervals, and a black image reference component occurring during periodic blanking intervals;
    a second signal source for providing a second video having an image information component occurring during periodic image intervals, and a black image reference component occurring during periodic blanking intervals; said black image reference component of said second signal varying between a black image level and an ultrablack image level;
    switching means having first and second input terminals respectively coupled to said first and second signal sources, a switching control input terminal and an output terminal coupled to said display device;
    first means for capacitively coupling said first signa source to said first input terminal of said switching means;
    second means for capacitively coupling said second signal source to said second input terminal of said switching means;
    timing means coupled to said switching control input of said switching means for causing said switching means to selectively exhibit first and second operating modes for respectively coupling said first and second input terminals of said switching means to said display device via associated first and second signal paths;
    means for providing a reference potential; and
    control means responsive to said reference potential and coupled to said first and second signal paths for automatically providing signals conveyed by said first and second signal paths to said display device with a common black image reference level;
    means interposed between said second signal source and said second capacitively coupling means for holding the value of said black image reference component applied to said second capacitively coupling means within predetermined limits.

2. The system defined in claim 1 wherein said video signal processing system is a television receiver; and wherein said first signal source consists of means for deriving said first video signal from a broadcast television signal coupled to an input terminal of said television receiver.

3. The system defined in claim 2 wherein said first video signal derived from said broadcast television signal is in the form of red, green and blue components thereof.

4. The system defined in claim 2 wherein said second signal source includes a further switching means having first and second input terminals for respectively receiving an auxiliary video signal and a processed pix-in-pix video signal, a switching control input terminal and an output terminal capacitively coupled to said second input terminal of said first-mentioned switching means.

5. The system defined in claim 4 further including an input connector coupled to an auxiliary signal source for providing red, green and blue components of said auxiliary video signal to said first input terminal of said further switching means.

6. The system defined in claim 5 further including a pix-in-pix signal processor for providing said processed pix-in-pix video signal to said second input terminal of said further switching means.

7. The system defined in claim 6 further including a composite video signal/switch having first and second input terminals for receiving composite video signals from respective sources, a switching control input terminal and an output terminal coupled to said means for deriving said first video signal; said composite signal switch selectively applying a selected one of said composite video signals to said means for deriving said first video signal in response to a control signal applied to its switching control input.

8. The system defined in claim 7 wherein one of said composite video signals is a television signal at the output of a tuner incorporated in said television receiver.

9. The system defined in claim 8 wherein the other of said composite video signals is a television signal at the output of a tuner incorporated in a video cassette recorder connected to said television receiver.

10. The system defined in claim 7 further having means for selectively applying the other of said composite video signals to said pix-in-pix signal processor.

11. The system defined in claim 10 wherein said further switching means is incorporated in a video coder/decoder integrated circuit (IC) also having said means for selectively applying said other composite video signal to said pix-in-pix processor.

12. The system defined in claim 11 wherein said coder/decoder IC further includes analog-to-digital and digital-to-analog conversion circuits for processing said pix-in-pix video signal, and a red, green and blue matrix for transforming the chroma and luma components of said processed pix-in-pix video signal to the respective red, green and blue components thereof for application to said second input terminal of said further switching means.

13. The system defined in claim 12 wherein said coder/decoder IC is programmed with information concerning operating parameters during certain blanking intervals, wherein said coder/decoder IC is arranged to provide an ultrablack level at said output terminal thereof during said certain blanking intervals while said coder/decoder IC is being programmed with said operating parameters.

14. The system defined in claim 1 further having a driver stage including a first transistor having a base coupled to said second signal source, an emitter coupled to said second capacitively coupling means and a collector coupled to a first reference potential source; wherein said holding means interposed between said second signal source and said second capacitively coupling means includes a second transistor having its base held at a preselected voltage level, its emitter coupled to said emitter of said first transistor and its collector coupled to a second reference potential source; wherein, when said second signal source outputs the ultrablack level, (1) said first transistor is turned off to decouple said second signal source from said second capacitively coupling means, and (2) said second transistor is turned on to clamp said secon capacitively coupling means at a voltage determined by said preselected voltage level minus the base-to-emitter voltage drop of said second transistor.

15. The system defined in claim 1 wherein said holding means further includes a voltage divider having a first terminal thereof coupled to said second reference potential source, having a second terminal thereof coupled to a ground potential, and having an intermediate point thereon coupled to said base of said second transistor.

16. A video signal processing system comprising:
a source of first and second video signals; said first video signal having potential excursions between a potential representing a white level and a potential representing a black level; said second video signal having potential excursions between a potential representing a white level and a potential representing an ultrablack level;
switch means having first and second input term and an output terminal coupled to a display device; said switch means being controlled to selectively couple one of its first and second input terminals to its output terminal; said switch means further including feedback means to periodically establish DC potentials on its first and second input terminals, thereby establishing a DC potential at its output terminal coupled to said display device;
a first coupling capacitor coupled between said source and said first input terminal of said switch means for coupling said first video signal thereto;
a second coupling capacitor having a first terminal coupled to said second input terminal of said switch means and having a second terminal;
means having an input terminal coupled to said source and an output terminal coupled to said second terminal of said second capacitor for coupling said second video signals thereto; and
claming means coupled to said output terminal of said means for coupling said second video signal for precluding potential excursions thereat from attaining said ultrablack level.

17. The system set forth in said claim 16 wherein clamping means comprises:
a source of reference potential proportional to said black level;
a transistor having first, second and control electrodes with a principal conduction path between said first and second electrodes controlled by potential applied between said control and first electrodes;
means for coupling said control electrode to said source reference potential;
means for coupling said first electrode to said output terminal of said means for coupling said second video signal; and
means for coupling said second electrode to a source of supply potential; wherein said transistor is conditioned to conduct when the potential of said second video signal occurring at said output terminal of said means for coupling said second video signal is less than said reference potential to clamp said output terminal of said means for coupling said second video signal at a voltage level related to said reference potential.

18. The system set forth in claim 17 wherein said means for coupling said second video signal includes an emitter-follower amplifier.

* * * * *

UNITED STATES PATENT AND TRADEMARK OFFICE
CERTIFICATE OF CORRECTION

PATENT NO. : 4,663,668

DATED : May 5, 1987

INVENTOR(S) : Khosro M. Rabii, et al.

It is certified that error appears in the above-identified patent and that said Letters Patent is hereby corrected as shown below:

Column 1, line 55, that portion reading "suita" should read -- suitable --; Column 2, line 3, that portion reading "hlue" should read -- blue --; line 20, that portion reading "component" should read -- components --; line 21, "s" should be deleted; Column 3, line 40 that portion reading "e,ovs/SCV/" should read -- $\overline{SCV}$ --; Column 4, line 62, that portion reading "OC" should read -- DC --; line 65, that portion reading "reguirements" should read -- requirements --; Column 6, line 7, that portion reading "generated" should read -- generator --; line 29, that portion reading "are" should read -- and --; line 66, "0" should be deleted; Column 7, line 38, that portion reading "hase" should read -- base --; line 52, that portion reading "auxi ary" should read -- auxiliary --; Column 8, line 1, after "video" insert -- signal --; line 13, that portion reading "signa" should read -- signal --; Column 9, line 52, that portion reading "secon" should read -- second --; Column 10, line 11, that portion reading "term" should read --terminals --; line 30, that portion reading "claming" should read -- clamping --; line 34, "said" should be deleted ; line 35, before "clamping" insert -- said --; line 44, before "reference" insert -- of --.

Signed and Sealed this

Fourteenth Day of June, 1988

Attest:

DONALD J. QUIGG

*Attesting Officer*   *Commissioner of Patents and Trademarks*